(12) United States Patent
Balakrishnan et al.

(10) Patent No.: US 11,307,851 B2
(45) Date of Patent: Apr. 19, 2022

(54) SYSTEMS AND METHODS FOR SOFTWARE SELF-HEALING USING AUTONOMOUS DECISION ENGINES

(71) Applicant: JPMORGAN CHASE BANK, N.A., New York, NY (US)

(72) Inventors: Swaroop Kumar Balakrishnan, Bengaluru (IN); Ramesh Kumar Appusamy, Tirupur (IN); Aditi Tagore Tavarageri, Bengaluru (IN)

(73) Assignee: JPMORGAN CHASE BANK, N.A., New York ( * ) Notice: Subject to any disclaimer, the term of this patent is extended or adjusted under 35 U.S.C. 154(b) by 0 days.

(21) Appl. No.: 17/116,993

(22) Filed: Dec. 9, 2020

(65) Prior Publication Data

US 2021/0191716 A1 Jun. 24, 2021

(30) Foreign Application Priority Data

Dec. 13, 2019 (IN) .............................. 201911051800

(51) Int. Cl.
 *G06F 8/71* (2018.01)
 *G06N 5/02* (2006.01)
(52) U.S. Cl.
 CPC .............. *G06F 8/71* (2013.01); *G06N 5/027* (2013.01)
(58) Field of Classification Search
 USPC ......................................................... 717/104
 See application file for complete search history.

(56) References Cited

U.S. PATENT DOCUMENTS

2005/0160395 A1\* 7/2005 Hughes .............. G06Q 30/0282
717/102

OTHER PUBLICATIONS

Martini et al., Investigating Architectural Technical Debt Accumulation . . . , 2015, Elsevier B.V., p. 257-253. (Year: 2015).\*

\* cited by examiner

*Primary Examiner* — John Q Chavis
(74) *Attorney, Agent, or Firm* — Greenberg Traurig LLP

(57) ABSTRACT

A method for software self-healing using an autonomous decision engine may include: receiving, at a software repository, source code; receiving mockup data comprising input data and expected output of the source code for the input data; providing the input data as an input to the source code resulting in a first actual output; identifying a difference between the expected output and the first actual output by comparing the expected output to the first actual output; applying a fix template to the source code in response to the expected output not matching the actual output; providing the input data as an input to the source code with the fix template, resulting in second actual output; comparing the expected output to the second actual output; and providing the result of the fix template to a rules prioritization engine in response to the expected output matching the second actual output.

16 Claims, 3 Drawing Sheets

| ID | CORRELATION_ID | LINE_START | LINE_END | SHADE_BENCHMARK | FIX_ATTEMPTS |
|----|----------------|------------|----------|-----------------|--------------|
| 1  | 1              | 360        | 365      | 4               | 2            |
| 1  | 1              | 367        | 368      | 4               | 2            |

FIGURE 3A

| ID | CORRELATION_ID | LINE_START | LINE_END | RANK | FIX FIX_TEMPLATE | FIX_ATTEMPTS |
|----|----------------|------------|----------|------|------------------|--------------|
| 1  | 1              | 360        | 365      | 1    | 266              | 2            |
| 1  | 1              | 367        | 368      | 2    | 161              | 2            |

FIGURE 3B

SYSTEMS AND METHODS FOR SOFTWARE SELF-HEALING USING AUTONOMOUS DECISION ENGINES

RELATED APPLICATIONS

This application claims priority to, and the benefit of, Indian Patent Application No. 201911051800 filed Dec. 13, 2019, the disclosure of which is hereby incorporated, by reference, in its entirety.

BACKGROUND OF THE INVENTION

1. Field of the Invention

Embodiments are directed to systems and methods for software self-healing using autonomous decision engines.

2. Description of the Related Art

Traditionally, exhaustive testing of code is required to explore all possible scenarios. This is both time-consuming and prone to error. To augment traditional testing, code can be statically analyzed to detect bugs using static checkers, such as "Infer". In medium to large scale systems, however, many errors can be uncovered by these checkers, which are very tedious to fix manually, and makes the process fallible.

SUMMARY OF THE INVENTION

Systems and methods for software self-healing using autonomous decision engines are disclosed. According to one embodiment, in an information processing apparatus comprising at least one computer processor, a method for software self-healing using an autonomous decision engine may include: (1) receiving, at a software repository, source code; (2) receiving mockup data comprising input data and expected output of the source code for the input data; (3) providing the input data as an input to the source code resulting in a first actual output; (4) identifying a difference between the expected output and the first actual output by comparing the expected output to the first actual output; (5) applying a fix template to the source code in response to the expected output not matching the actual output; (6) providing the input data as an input to the source code with the fix template, resulting in second actual output; (7) comparing the expected output to the second actual output; and (8) providing the result of the fix template to a rules prioritization engine in response to the expected output matching the second actual output.

In one embodiment, the method may further include identifying at least one difference between the source code and the source code with the fix template; providing the at least one difference to the rules prioritization engine; and updating at least one of a core rule, a platform-specific rule, and an application specific rule based on the at least one difference.

In one embodiment, the rules prioritization engine may apply at least of a core rule, a platform-specific rule, and an application specific rule to the source code.

In one embodiment, the method may further include retrieving the fix template from a plurality of fix templates, and the plurality of fix templates may be prioritized based on machine learning.

In one embodiment, the fix template may be applied to a source code mirror, and the fix template may be applied to the source code after the actual output of the source code output matches the expected output.

In one embodiment, the method may further include the rules prioritization engine updating at least one rule based on the results.

According to another embodiment, in an information processing apparatus comprising at least one computer processor, a method for software self-healing using an autonomous decision engine may include: (1) receiving, at a software repository, source code; (2) receiving mockup data comprising input data and expected output of the source code for the input data; (3) providing the input data as an input to the source code resulting in an actual output; (4) determining that the expected output matches the actual output; (5) providing the determination to a rules prioritization engine; and (6) the rules processing engine updating at least one rule in response to the determination.

In one embodiment, the at least one rule may include at least one of a core rule, a platform-specific rule, and an application specific rule.

In one embodiment, the rules prioritization engine may apply at least of a core rule, a platform-specific rule, and an application specific rule to the source code.

In one embodiment, the method may further include the rules prioritization engine updating at least one rule based on the results.

According to another embodiment, a system for software self-healing using an autonomous decision engine may include a rules prioritization engine, a decision network, a source code repository, a first comparator, a fix processor, a fix template database, and a second comparator. The software repository may receive source code. The decision engine may receive mockup data comprising input data and expected output of the source code for the input data, and may provide the input data as an input to the source code resulting in a first actual output. The first comparator may identify a difference between the expected output and the first actual output by comparing the expected output to the first actual output. The fix processor may apply a fix template from the fix template database to the source code in response to the expected output not matching the actual output. The decision engine may provide the input data as an input to the source code with the fix template, resulting in second actual output. The first comparator may compare the expected output to the second actual output. The second comparator may provide the result of the fix template to a rules prioritization engine in response to the expected output matching the second actual output.

In one embodiment, the second comparator may also identify at least one difference between the source code and the source code with the fix template, may provide the at least one difference to the rules prioritization engine, and may update at least one of a core rule, a platform-specific rule, and an application specific rule based on the at least one difference.

In one embodiment, the rules prioritization engine may apply at least of a core rule, a platform-specific rule, and an application specific rule to the source code.

In one embodiment, the plurality of fix templates may be prioritized based on machine learning.

In one embodiment, the fix template mat be applied to a source code mirror, and may be applied to the source code after the actual output of the source code output matches the expected output.

In one embodiment, the rules prioritization engine may update at least one rule based on the results.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

FIGS. 3A and 3B depict exemplary expected and actual pictorial representations of source code, respectively.

DETAILED DESCRIPTION OF PREFERRED EMBODIMENTS

Systems and methods for software self-healing using autonomous decision engines are disclosed. According to embodiments, a self-healing decision engine may use a decision network and a rules-based engine to intelligently fix bugs in application code. Embodiments may analyze and fix issues both during development at application run-time. The decision network may be based on a machine learning platform, for example, TensorFlow, that may be augmented with a pre-defined set of rules and static analysis of actual source code. This decision network may intelligently infer differences between the actual application code and its expected state. It may then apply a pre-defined set of templates to automatically apply fixes to the "buggy" code.

Embodiments may provide a hands-off approach to development and testing, where the engineers can rely on the system to find and fix bugs very early in the cycle. This, in turn, improves the quality of code, and reduces the time that teams spend testing and isolating bugs in the code.

Figure 1:
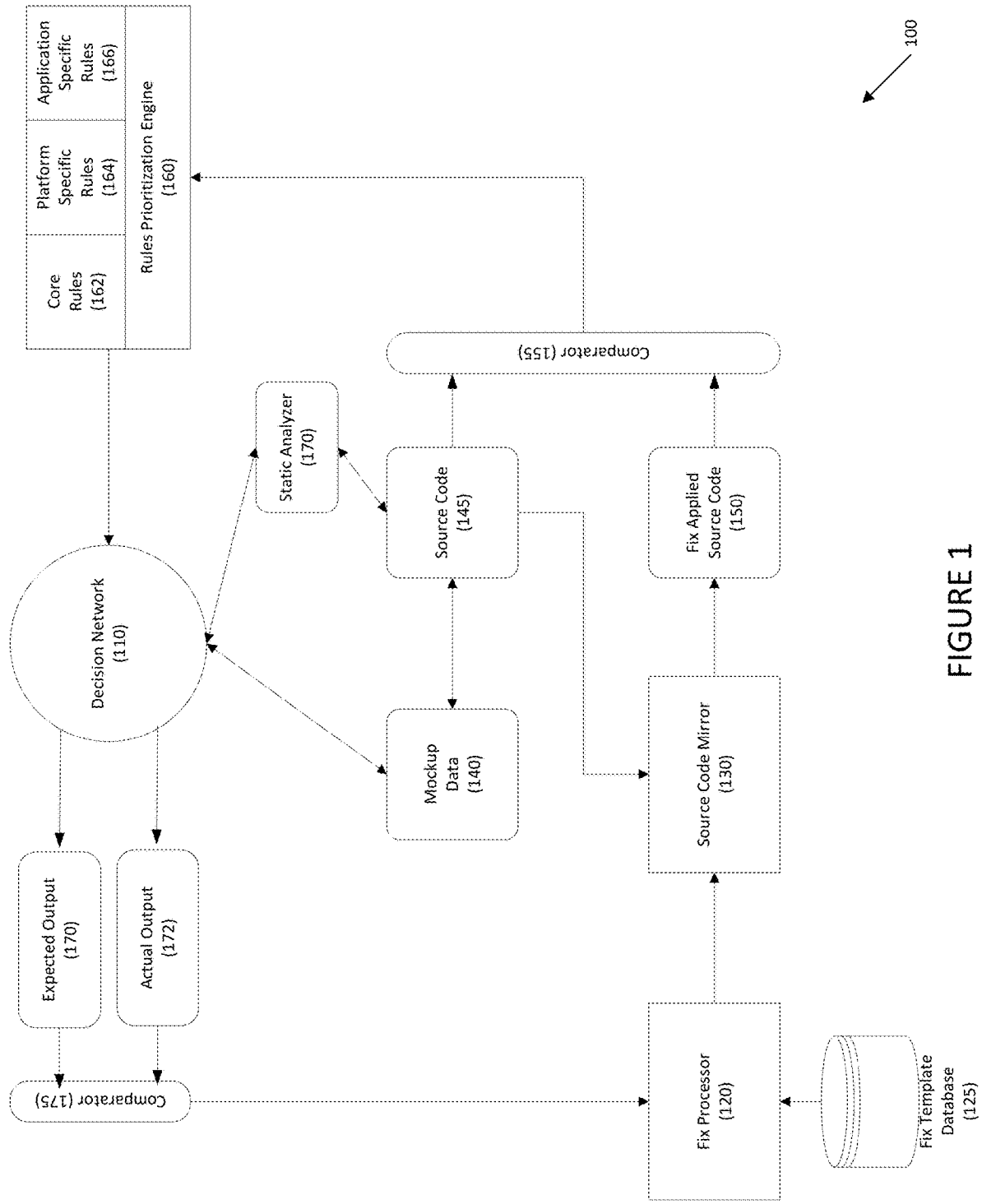
FIG. 1 depicts an architectural diagram of a system for software self-healing using an autonomous decision engine according to one embodiment.

Referring to FIG. 1, an architectural diagram for a system for software self-healing using an autonomous decision engine is disclosed according to one embodiment. System 100 may include decision network 110, rules prioritization engine 160, fix processor 120, fix template database 125, source code mirror 130, comparator 155, comparator 175, software repository (not shown), etc.

In one embodiment, decision network 110 may be implemented by an electronic device, such as a workstation, a server, in the cloud, etc.

Rules prioritization engine 160 may include core rules 162, platform-specific rules 164, and application specific rules 166. Core rules 162 may include rules defined by humans; as system 100 operates, it may automatically update core rules 162, as well as platform-specific rules 164 and application-specific rules 166.

Examples of core rules 162 include rules that enforce coding standards recommended for specific programming language. Examples of application rules 166 include rules that apply a standard to an application and/or a framework (e.g., a user interface framework). Examples of platform-specific rules 164 include rules that are enforced by a platform (e.g., Human Interface guideline provided by Apple for the iOS platform). Examples of application-specific rules 166 may include rules that are enforced by an application (e.g., a credit card processing application requires a credit card number to have 16 digits).

Mockup data 140 may include data that may be used to test source code 145. For example, mockup data may include input data that may be input into source code 145, as well as expected output 170 for the input data. In one embodiment, mockup data 140 may be created by "JMock," a library of mock objects, for Java.

For example, mockup data 140 may include a collection of manually-created data along with a fix template from fix template database 125 to test and train the fix code. In general, fix templates are code templates available for most programming languages.

A fix template may include a semantic analyzer and application written source programming language from which the code is fixed.

Decision network 110 may further receive input from static analyzer 170 that lexically analyses source code 145 that is being checked in to a software repository (not shown). An example static analyzer is Infer. Mockup data 140 may then be used to generate actual output 172 of source code 145. In one embodiment, the actual output 172 may be a matrix.

Decision network 110 may build expected output 170 of source code 145 based on the input from rule prioritization engine 160. In one embodiment, expected output 110 may be in a matrix.

An illustrative example of checked-in code, mockup data, expected output, and rules is provided below:

Actual Code Checked-In:

```
private float divide (float a, float b)
{
    return a/b;
}
```

Mockup Data Prepared as Part of Unit Testing Checked-In:

| a | b | Expected output |
|---|---|-----------------|
| 1 | 1 | 1 |
| 0 | 1 | 0 |
| 1 | 0 | Error |
| 1 | 2 | 0.5 |

Core Rule:

| ID | Severity | Category | Name | Description | Enabled |
|----|----------|----------|------|-------------|---------|
|    | Break | Arithmetic | DIV_BY_ZERO | Do not Divide primetype by zero | true |

Expected output 170 and actual output 172 may then be compared using, for example, comparator 175, to detect errors in source code 145. For example, if actual output 172 does not match expected output 170, one or more errors may be detected.

In one embodiment, the expected output is not only output of mock data execution, but it may include the output of decision network and updated rules based on inferred specification (learned and improved from check-ins), the output of static analyzer 170, etc. Examples of expected output 170 and actual output 172 are provided in FIGS. 3A and 3B, respectively.

Once the errors are identified, fix processor 120 may identify one or more fix templates from fix template database 125. In one embodiment, the order of application may be prioritized manually, and machine learning may be used to update the priority. Once a fix template is identified, the code in source code mirror 130 may be updated with the changes in the fix templated, resulting in fix applied source code 150.

For the example, above, fix templates in fix template database 125 in their application priority may include:

apply_exception_handler_generic
apply_math_exception
apply_math_fix_infinity
apply_zerocheck_condition (<Param variable name>)
apply_cleanup_unused In one embodiment, a feedback loop may be used to feed into rules engine 160. In one embodiment, comparator 155 may identify difference(s) between source code 145 and fix applied source code 150, and the difference(s) may be fed back into rules engine 160. The difference(s) provide a source for rules engine 160 to update core rules 162, platform-specific rules 164, and/or application specific rules 166.

In one embodiment, rules (e.g., core rules 162, platform-specific rules 164, and/or application-specific rules 166) may be updated systematically and/or manually based on the code merged in the base code.

Figure 2:
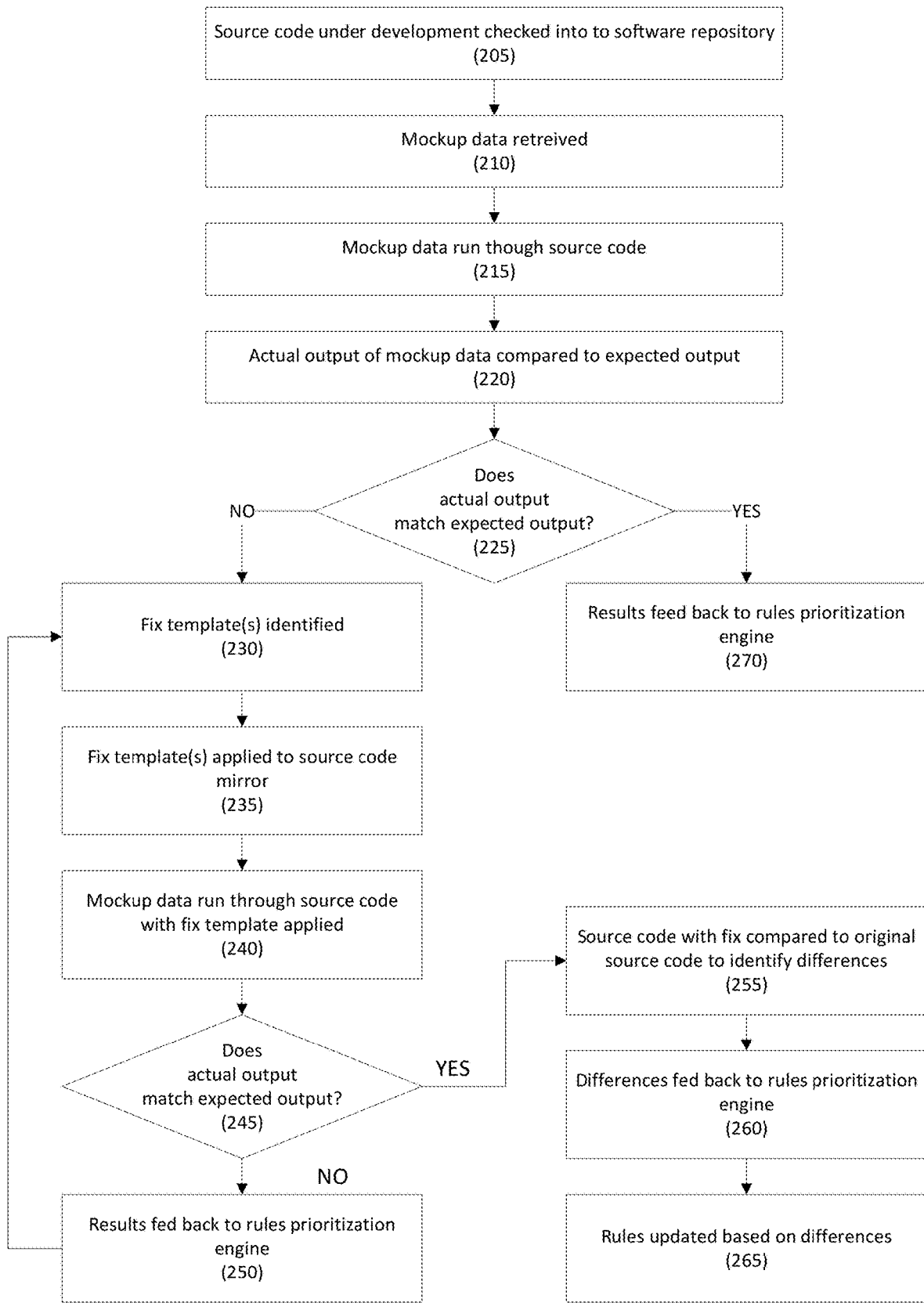
FIG. 2 depicts a method for software self-healing using an autonomous decision engine according to one embodiment.

Referring to FIG. 2, a method for software self-healing using an autonomous decision engine is disclosed according to one embodiment.

In step 205, software (e.g., source code) under development may be checked into a software repository.

In step 210, mockup data for the source code may be retrieved. In one embodiment, the mockup data may include input data and expected output. In one embodiment, expected output may include the expected output from executing the input data, as well as expected content, format, etc. for the source code, etc.

In step 215, the mockup data may be input to the source code, which may result in actual output.

In step 220, the actual output may be compared to the expected output for the mockup data. If, in step 225, the actual output and the expected output match, in step 270, the results may be fed back to the prioritization engine.

If the actual output does not match the expected output, in step 230, one or more fix templates may be identified to fix the error(s).

In one embodiment, a fix processor may identify one or more fix templates from a fix template database.

In one embodiment, the fix templates may initially be prioritized manually, and may be re-prioritized, removed, etc. based on machine learning.

In step 235, the selected fix template may be applied to the source code using, for example, a source code mirror so that the actual source code is unchanged.

In step 240, the mockup data may be input to the source code with the fix template applied, and this output may be compared to the expected output for the mockup data. If, in step 245, the actual output does not match the expected output, in step 250, the results may be fed back to the rules prioritization engine, which may then adjust the rules. Returning to step 230, the next fix template may be identified, and the process of applying the next fix templated, inputting the mockup data to the source code with the fix template, and comparing the actual output to the expected output may be repeated until the actual output matches the expected output.

If, in step 245, the actual output does match the expected output, in step 255, the source code with the fix applied may be compared to the original source code to identify the differences following the fix, and in step 260, the differences may be fed back to the rules prioritization engine. In step 265, the rules prioritization engine may update one or more of the rules (e.g., core rules, platform-specific rules, and/or application specific rules, etc.) as appropriate.

For example, an appropriate pull request may be created based on the fixed source code. The pull request may be sent to the originator of the error and approvers. Based on the approval/denial of fix, the decision network may adjust bias/weightage as necessary and/or desired. Process of adjusting bias or weightings may be iterative as is necessary and/or desired.

Although several embodiments have been disclosed, it should be recognized that these embodiments are not mutually exclusive, and features from one embodiment may be used with others.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for software self-healing using an autonomous decision engine, comprising:
   in an information processing apparatus comprising at least one computer processor:
   receiving, at a software repository, source code;
   receiving mockup data comprising input data and expected output of the source code for the input data;
   providing the input data as an input to the source code resulting in a first actual output;
   identifying a difference between the expected output and the first actual output by comparing the expected output to the first actual output;
   applying a fix template to the source code in response to the expected output not matching the actual output;
   providing the input data as an input to the source code with the fix template, resulting in second actual output;
   comparing the expected output to the second actual output; and
   providing the result of the fix template to a rules prioritization engine in response to the expected output matching the second actual output.

2. The method of claim 1, further comprising:
   identifying at least one difference between the source code and the source code with the fix template;
   providing the at least one difference to the rules prioritization engine; and
   updating at least one of a core rule, a platform-specific rule, and an application specific rule based on the at least one difference.

3. The method of claim 1, wherein the rules prioritization engine applies at least of a core rule, a platform-specific rule, and an application specific rule to the source code.

4. The method of claim 1, further comprising:
   retrieving the fix template from a plurality of fix templates;
   wherein the plurality of fix templates are prioritized based on machine learning.

5. The method of claim 1, wherein the fix template is applied to a source code mirror, and the fix template is applied to the source code after the actual output of the source code output matches the expected output.

6. The method of claim 1, further comprising:
   the rules prioritization engine updating at least one rule based on the results.

7. A method for software self-healing using an autonomous decision engine, comprising:
   in an information processing apparatus comprising at least one computer processor:
   receiving, at a software repository, source code;
   receiving mockup data comprising input data and expected output of the source code for the input data;
   providing the input data as an input to the source code resulting in an actual output;
   determining that the expected output matches the actual output;
   providing the determination to a rules prioritization engine; and
   the rules processing engine updating at least one rule in response to the determination.

8. The method of claim 7, wherein the at least one rule comprises at least one of a core rule, a platform-specific rule, and an application specific rule.

9. The method of claim 7, wherein the rules prioritization engine applies at least of a core rule, a platform-specific rule, and an application specific rule to the source code.

10. The method of claim 7, further comprising:
    the rules prioritization engine updating at least one rule based on the results.

11. A system for software self-healing using an autonomous decision engine, comprising:
    a rules prioritization engine;
    a decision network;
    a source code repository;
    a first comparator;
    a fix processor;
    a fix template database; and
    a second comparator;
    wherein:
    the software repository receives source code;
    the decision engine receives mockup data comprising input data and expected output of the source code for the input data;
    the decision engine provides the input data as an input to the source code resulting in a first actual output;

the first comparator identifies a difference between the expected output and the first actual output by comparing the expected output to the first actual output;

the fix processor applies a fix template from the fix template database to the source code in response to the expected output not matching the actual output;

the decision engine provides the input data as an input to the source code with the fix template, resulting in second actual output;

the first comparator compares the expected output to the second actual output; and the second comparator provides the result of the fix template to a rules prioritization engine in response to the expected output matching the second actual output.

12. The system of claim 10, wherein:

the second comparator identifies at least one difference between the source code and the source code with the fix template;

the second comparator provides the at least one difference to the rules prioritization engine; and the rules prioritization engine updates at least one of a core rule, a platform-specific rule, and an application specific rule based on the at least one difference.

13. The system of claim 10, wherein the rules prioritization engine applies at least of a core rule, a platform-specific rule, and an application specific rule to the source code.

14. The system of claim 10, wherein the plurality of fix templates are prioritized based on machine learning.

15. The system of claim 10, wherein the fix template is applied to a source code mirror, and the fix template is applied to the source code after the actual output of the source code output matches the expected output.

16. The system of claim 10, wherein the rules prioritization engine updates at least one rule based on the results.

* * * * *